United States Patent
Harrison et al.

(10) Patent No.: US 11,630,569 B2
(45) Date of Patent: Apr. 18, 2023

(54) SYSTEM, METHOD AND DEVICES FOR TOUCH, USER AND OBJECT SENSING FOR IOT EXPERIENCES

(71) Applicant: CARNEGIE MELLON UNIVERSITY, Pittsburgh, PA (US)

(72) Inventors: Christopher Harrison, Pittsburgh, PA (US); Gierad Laput, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/796,167

(22) Filed: Feb. 20, 2020

(65) Prior Publication Data

US 2020/0264769 A1 Aug. 20, 2020

Related U.S. Application Data

(60) Provisional application No. 62/808,011, filed on Feb. 20, 2019.

(51) Int. Cl.
*G06F 3/04883* (2022.01)
*G06F 3/046* (2006.01)
(Continued)

(52) U.S. Cl.
CPC ........ *G06F 3/04883* (2013.01); *G01S 7/4808* (2013.01); *G01S 17/42* (2013.01);
(Continued)

(58) Field of Classification Search
CPC .... G06F 3/04883; G06F 3/017; G06F 3/0304; G06F 3/046; G01S 7/4808; G01S 17/42; G01S 17/88; G01S 17/66; G16Y 20/00
See application file for complete search history.

(56) References Cited

U.S. PATENT DOCUMENTS 7,911,453 B2 * 3/2011 Wilson .................... G06F 3/041
345/173
9,201,499 B1 * 12/2015 Chang .................... G06F 3/011
(Continued)

OTHER PUBLICATIONS

Paradiso, J. A., et al. "Sensor systems for interactive surfaces." IBM Systems Journal 39, No. 3.4 (2000): 892-914.
(Continued)

*Primary Examiner* — Michael J Jansen, II
(74) *Attorney, Agent, or Firm* — David G. Oberdick; Chiara F. Orsini

(57) ABSTRACT

Internet of Things ("IoT") appliances are gaining consumer traction, from smart thermostats to smart speakers. These devices generally have limited user interfaces, most often small buttons and touchscreens, or rely on voice control. Further, these devices know little about their surroundings—unaware of objects, people and activities around them. Consequently, interactions with these "smart" devices can be cumbersome and limited. The present invention presents an approach that enriches IoT experiences with rich touch and object sensing, offering a complementary input channel and increased contextual awareness. The present invention incorporates a range sensing technology into the computing devices, providing an expansive ad hoc plane of sensing just above the surface with which a device is associated. Additionally, the present invention can recognize and track a wide array of objects, including finger touches and hand gestures. The present invention can also track people and estimate which way they are facing.

25 Claims, 11 Drawing Sheets

(51) Int. Cl.
*G06F 3/01* (2006.01)
*G01S 17/42* (2006.01)
*G01S 7/48* (2006.01)
*G01S 17/88* (2006.01)
*G01S 17/66* (2006.01)
*G16Y 20/00* (2020.01)

(52) U.S. Cl.
CPC ............. *G01S 17/88* (2013.01); *G06F 3/017* (2013.01); *G06F 3/046* (2013.01); *G01S 17/66* (2013.01); *G16Y 20/00* (2020.01)

(56) References Cited

U.S. PATENT DOCUMENTS

| | | | | |
|---|---|---|---|---|
| 9,305,216 | B1* | 4/2016 | Mishra | G06K 9/4604 |
| 9,377,863 | B2* | 6/2016 | Bychkov | G06F 3/0486 |
| 9,575,560 | B2* | 2/2017 | Poupyrev | G06F 3/017 |
| 9,778,749 | B2* | 10/2017 | Poupyrev | G06F 21/316 |
| 10,126,820 | B1* | 11/2018 | Chang | G06F 3/017 |
| 10,261,584 | B2* | 4/2019 | Gill | H04N 5/247 |
| 10,289,203 | B1* | 5/2019 | Liu | G06F 3/017 |
| 10,331,276 | B2* | 6/2019 | Marshall | G01B 11/02 |
| 10,409,385 | B2* | 9/2019 | Poupyrev | G01S 13/42 |
| 10,877,568 | B2* | 12/2020 | Huang | G06F 3/017 |
| 10,936,081 | B2* | 3/2021 | Poupyrev | G06F 21/316 |
| 11,169,611 | B2* | 11/2021 | Guendelman | G06F 3/0486 |
| 11,221,682 | B2* | 1/2022 | Poupyrev | G01S 13/42 |
| 11,308,672 | B2* | 4/2022 | Chaney | G09G 5/12 |
| 2009/0002327 | A1* | 1/2009 | Wilson | G06F 3/041 |
| | | | | 345/173 |
| 2012/0280900 | A1* | 11/2012 | Wang | G06F 3/0488 |
| | | | | 345/156 |
| 2013/0283208 | A1* | 10/2013 | Bychkov | G06F 3/0425 |
| | | | | 715/810 |
| 2013/0283213 | A1* | 10/2013 | Guendelman | G06F 3/017 |
| | | | | 715/848 |
| 2015/0346820 | A1* | 12/2015 | Poupyrev | G06F 3/014 |
| | | | | 345/156 |
| 2016/0054803 | A1* | 2/2016 | Poupyrev | G06F 3/017 |
| | | | | 345/156 |
| 2017/0060242 | A1* | 3/2017 | Gill | G02B 5/1842 |
| 2018/0004301 | A1* | 1/2018 | Poupyrev | G06F 21/32 |
| 2018/0188893 | A1* | 7/2018 | Marshall | G01B 11/02 |
| 2019/0212901 | A1* | 7/2019 | Garrison | G09G 5/12 |
| 2019/0391667 | A1* | 12/2019 | Poupyrev | G06F 21/316 |
| 2020/0201443 | A1* | 6/2020 | Huang | G06V 30/32 |
| 2020/0264769 | A1* | 8/2020 | Harrison | G06F 3/04883 |
| 2020/0294297 | A1* | 9/2020 | Chaney | G06F 3/04815 |
| 2020/0294298 | A1* | 9/2020 | Chaney | G06F 3/017 |
| 2021/0132702 | A1* | 5/2021 | Poupyrev | G06F 21/316 |

OTHER PUBLICATIONS

Strickon, J. et al. "Tracking hands above large interactive surfaces with a low-cost scanning laser rangefinder." In CHI 98 Conference Summary on Human Factors in Computing Systems, pp. 231-232. 1998.

Gregor, D. et al. 2017. Digital playgroundz. In ACM SIGGRAPH 2017 VR Village (SIGGRAPH '17). ACM, New York, NY, USA, Article 4, 2 pages. DOI: https://doi.org/10.1145/3089269.3089288.

Cassinelli, A. et al. "Smart laser-scanner for 3D human-machine interface." In CHI'05 Extended Abstracts on Human Factors in Computing Systems, pp. 1138-1139. 2005.

* cited by examiner

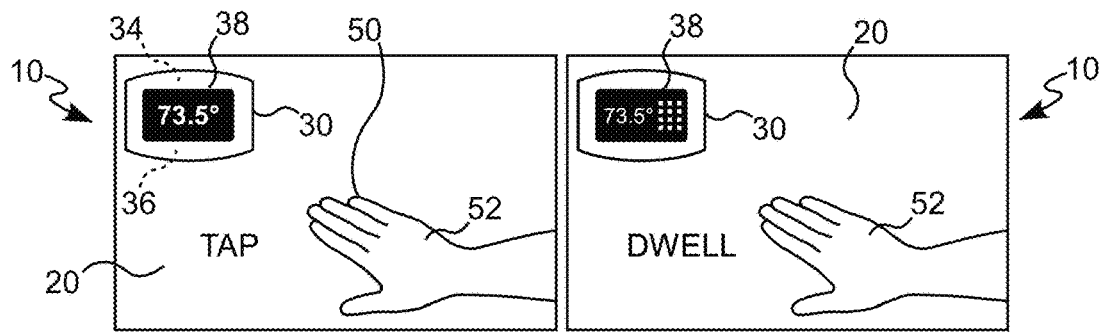
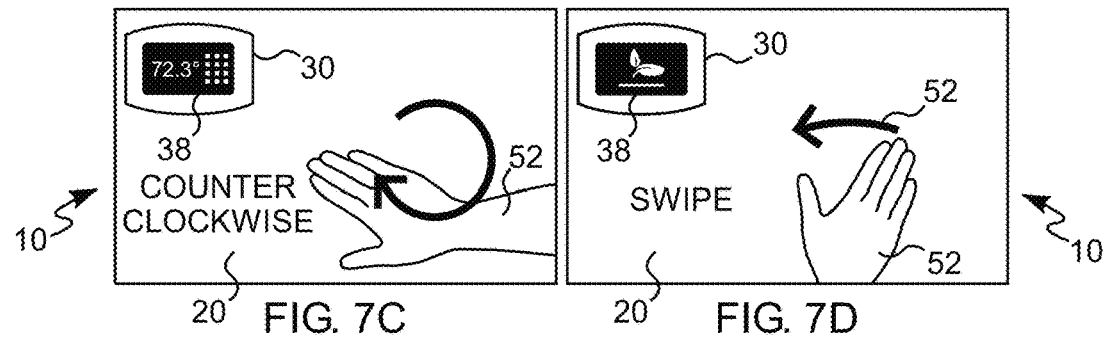
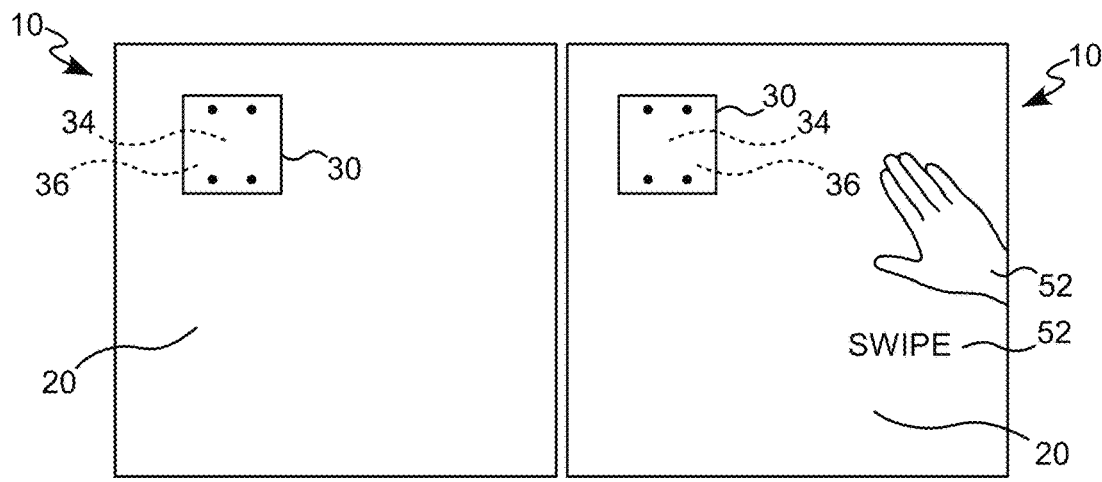
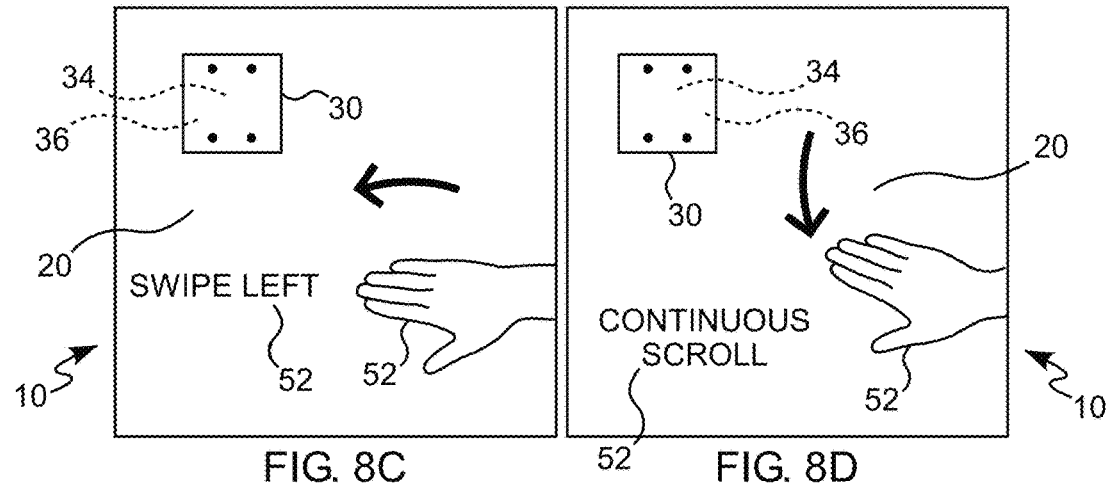

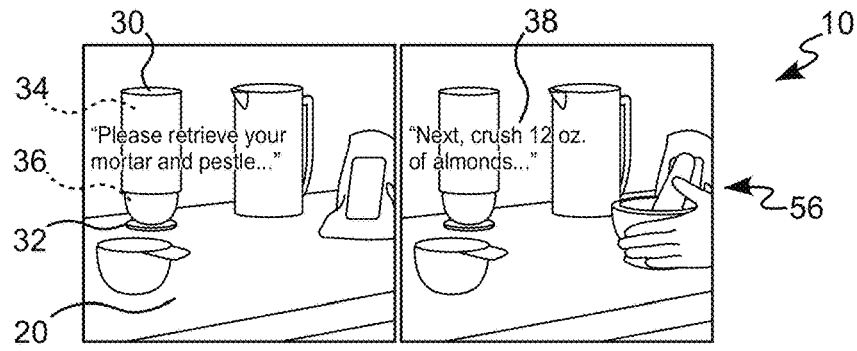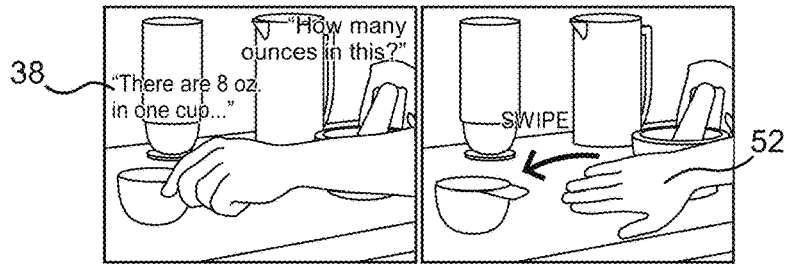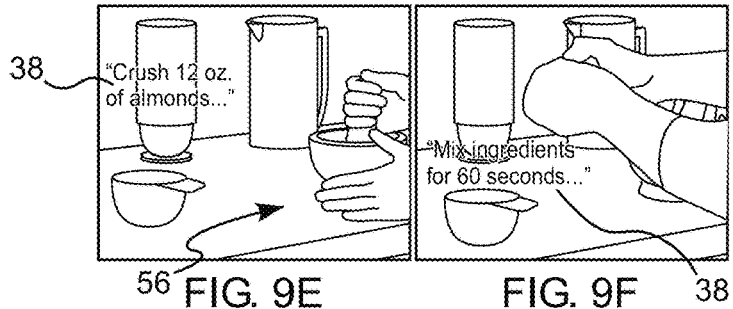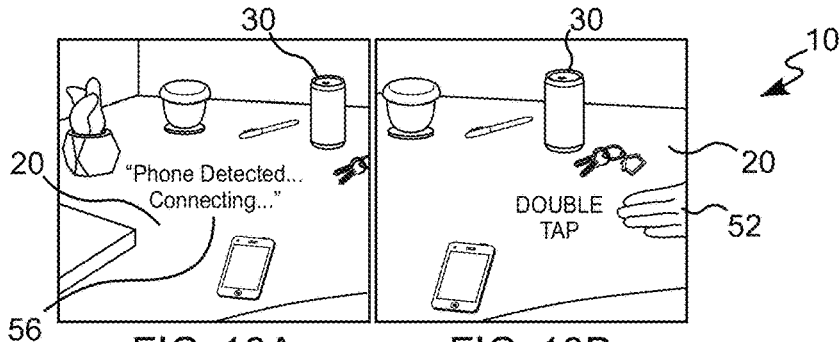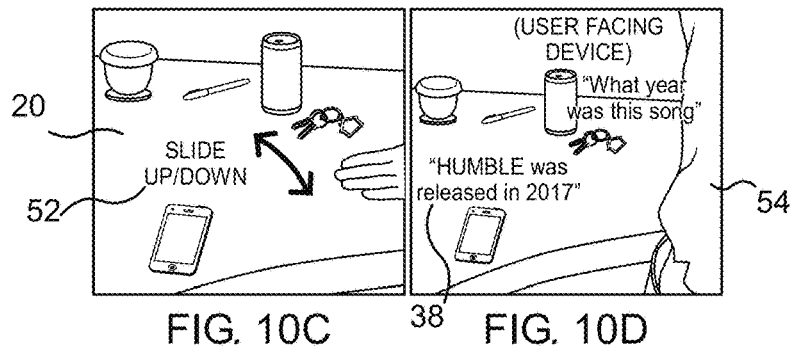

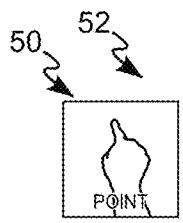
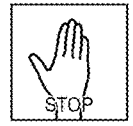
FIG. 11A  FIG. 11B  FIG. 11C  FIG. 11D  FIG. 11E
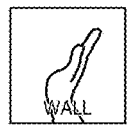
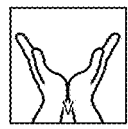
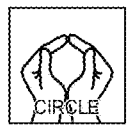
FIG. 11F  FIG. 11G  FIG. 11H  FIG. 11I  FIG. 11J
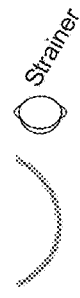
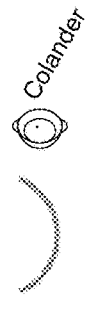
FIG. 12A  FIG. 12B  FIG. 12C  FIG. 12D  FIG. 12E
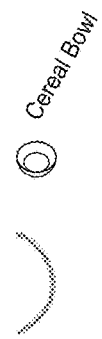
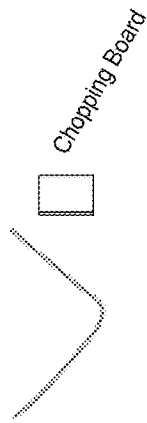
FIG. 12F  FIG. 12G  FIG. 12H  FIG. 12I  FIG. 12J

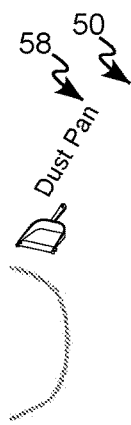 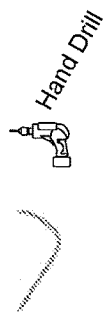 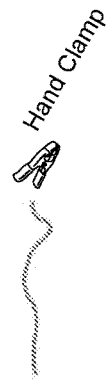   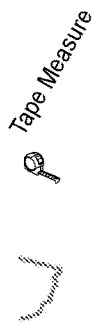
FIG. 15A  FIG. 15B  FIG. 15C  FIG. 15D  FIG. 15E  FIG. 15F
   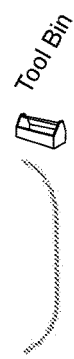  
FIG. 15G  FIG. 15H  FIG. 15I  FIG. 15J  FIG. 15K  FIG. 15L

SYSTEM, METHOD AND DEVICES FOR TOUCH, USER AND OBJECT SENSING FOR IOT EXPERIENCES

CROSS-REFERENCE TO RELATED APPLICATION

This application claims priority to U.S. Provisional Application Ser. No. 62/808,011, filed on Feb. 20, 2019, which application is incorporated by reference herein in its entirety.

BACKGROUND OF THE INVENTION

Field of the Invention

Smart and connected "Internet of Things" appliances are gaining consumer traction, from smart thermostats to smart speakers. These devices generally have limited user interfaces, most often small buttons and touchscreens, or rely on voice control. Further, these devices know little about their surroundings—and are unaware of objects, people and activities around them. Consequently, interactions with these "smart" devices can be cumbersome and limited. The present invention encompasses a system, method and category of augmented devices and an associated approach that enrich IoT experiences with rich touch and object sensing, offering a complementary input channel and increased contextual awareness.

Description of Related Art

Small, internet-connected appliances are becoming increasingly common in homes and offices, forming a nascent, consumer-oriented "Internet of Things" ("IoT"). Product categories such as smart thermostats, light bulbs and speakers have shipped tens of millions of units in 2018 alone, with sales predicted to increase dramatically in the coming years. See Louis Columbus, 2017 *Roundup of Internet of Things Forecasts*, Forbes, Dec. 10, 2017.

Inputs on these devices tens to fall into one of three categories. First, there are products with extremely limited or no on-device input, which require an accessory, such as a physical remote or smartphone app, for control (e.g., Apple TV, Philips Hue bulbs). Second, and perhaps most pervasive at present, are for devices to offer some physical controls and/or a touchscreen for configuration and control (e.g., Nest Thermostat, smart locks, smart refrigerators). Finally, there are "voice-first" interfaces that might entirely lack on-device controls (e.g., Google Home, Amazon Alexa, Apple HomePod). Regardless of the input modality, the user experience is generally recognized to be cumbersome, with both small screens and voice interaction having well-studied human computer interaction ("HCI") bottlenecks.

Another long-standing HCI research area, and drawback of current generation consumer IoT devices, is a limited awareness of context (see Gregory D. Abowd, Anind K. Dey, Peter J. Brown, Nigel Davies, Mark Smith, and Pete Steggles, *Towards a Better Understanding of Context and Context-Awareness*, Proceedings of the 1st international symposium on Handheld and Ubiquitous Computing (HUC '99), Hans-Werner Gellersen (Ed.) Springer-Verlag, London, UK, UK, 304-307). See also Slamtec RPLIDAR A2 (at https://www.slamtec.com/en/Lidar/A2Spec last retrieved Sep. 19, 2018). An archetype of this interactive shortfall is a smart speaker sitting on a kitchen countertop, which does not know where it is, or what is going on around it. As a consequence, the device cannot proactively assist a user in tasks or resolve even rudimentary ambiguities in user questions.

The present invention demonstrates how the addition of a range sensing technology, such as commodity light detection and ranging ("LIDAR") sensing or depth cameras, into consumer IoT devices can be used to unlock not only a complementary input channel (expansive, ad hoc touch input), but also improved object recognition and person tracking through creation of a sensing plane above a monitored surface. Taken together, these capabilities significantly expand and improve the interactive opportunities for this class of devices. This utility is illustrated through a set of functional example applications, and quantified in the performance of main features in a multi-part user study.

The present invention intersects with several large bodies of HCI research, including ad hoc touch sensing, tracking of both objects and people in environments, and around-device interaction. The following brief review of this expansive literature focuses primarily on major methodological approaches and a more in-depth review of other systems that have employed range finding sensors for input and context sensing.

Ad Hoc Touch Sensing:

Research into enabling touch sensing on large, ad hoc surfaces (also referred to as "appropriated" interaction surfaces) goes back at least two decades. By far, the most common approach is to use optical sensors, including infrared emitter-detector arrays, infrared cameras, depth cameras and thermal imaging. Acoustic methods have also been well explored, using sensors placed at the periphery of a surface or centrally located. Large scale capacitive sensing is also possible with some surface instrumentation (which can be hidden, e.g., with paint), using discrete patches, tomographic imaging, and projective capacitive electrode matrices.

Sensing Objects in Environments:

Many approaches for automatic object recognition have been explored in previous research. Typical methods involve direct object instrumentation, such as fiducial markers, acoustic barcodes, RFID tags, Bluetooth Low Energy tags and NFCs. Although direct object instrumentation can be fairly robust, it can be difficult to scale, and can incur installation and maintenance costs. A complementary approach is to sparsely instrument the environment with cameras, radar, microphones, or through worn sensors. These minimally invasive approaches provide a practical alternative for object and human activity recognition that can power contextually-aware applications.

Person Sensing and Tracking:

Many types of systems (from energy efficient buildings to virtual agents) can benefit from knowledge of user presence, occupancy load, and user identification. As such, a variety of methods have been considered over many decades. One approach is to have users carry a device such as a badge. Numerous systems with this configuration have been proposed, and they can be categorized as either active (i.e., badge emits an identifier) or passive (i.e., badge listens for environment signals). Badge-based sensing systems come in other forms, including RFID tags, infrared proximity badges, microphones and Bluetooth tags. To avoid having to instrument users, researchers have looked at methods including Doppler radar, RFID tracking and co-opting WiFi signals. However, perhaps most ubiquitous are Pyroelectric Infrared ("PIR") sensors, found in nearly all commercial motion detectors, which use the human body's black body radiation to detect motion in a scene. Also common are optical methods, including IR proximity sensors and camera-based approaches.

Around-Device Interactions:

Another related area is the subdomain of Around Device Interaction ("ADI"). Typically, this is for mobile and worn devices, and for capturing touch or gesture input. Several sensing principles have been explored, including acoustics, hall-effect sensors, IR proximity sensors, electric field sensing, magnetic field tracking, and time-of-flight depth sensing. Across all these techniques, the overarching goal is to increase input expressivity by leveraging the area around the device as an interaction surface. The present invention complements and improves upon the work in this space by adding a novel set of interaction modalities and contextual awareness. The novel modalities include, but are not limited to, "hand" inputs, including hand shapes, gestures, hand and finger movements within a predetermined region, and finger touching; "person" inputs based upon a person's presence, position and orientation within a predetermined region; "event" inputs based upon defined events happening within a predetermined region; and "object" inputs based upon an object's presence, absence, or movement within a predetermined region. The present invention's creation of a 360° plane parallel to the host surface area (a sheet or plane of interactivity) is novel in this technology field.

LIDAR in Interactive Systems:

Originally a portmanteau of light and radar, LIDAR uses the time-of-flight or parallax of laser light to perform range finding. First developed in the 1960s, the initial high cost limited use to scientific and military applications. Today, LIDAR sensors can be purchased for under $10, for example, STMicroelectronics's VL53L0X. The latter component is an example of a 1D sensor, able to sense distance along a single axis. Electromechanical (most often spinning) 2D sensor units are also popular, starting under $100 in single unit, retail prices (e.g., YDLIDAR X4 360°). This is the type of sensor used in one embodiment of the present invention. It will be apparent to one skilled in the art that many different types of LIDAR sensors can be used for these purposes and all such sensors are encompassed by this invention.

Prices are likely to continue to fall (with quality increasing) due to economies of scale resulting from extensive LIDAR use in robotics and autonomous cars. Solid state LIDAR and wide-angle depth cameras are likely to supersede electromechanical systems in the near future; the interaction techniques presented in this work should be immediately applicable, and likely enhanced with such improvements.

Although popular in many fields of research, LIDAR is surprisingly uncommon in HCI work. It is most commonly seen in human-robot interaction papers, where the robot uses LIDAR data to e.g., track and approach people. Of course, robots also use LIDAR for obstacle avoidance and recognition, which has similarities to our object recognition and tracking pipeline.

Most similar to the present invention are the very few systems that have used LIDAR for touch sensing. Amazingly, one of the very earliest ad hoc touch tracking systems, LaserWall, first demonstrated in 1997, used spinning LIDAR operating parallel to a surface. See Joseph Paradiso, Kaiyuh Hsiao, Joshua Strickon, Joshua Lifton and A. Adler in *Sensor Systems for Interactive Surfaces* (IBM Systems Journal, Volume 39, Nos. 3 & 4, October 2000, pp. 892-914). See also Joshua Strickon and Joseph Paradiso in *Tracking hands above large interactive surfaces with a low-cost scanning laser rangefinder* (CHI 98 Conference Summary on Human Factors in Computing Systems (CHI '98), ACM, New York, N.Y., USA, 231-232. DOI: http://dx.doi.org/10.1145/286498.286719). Since then, only one other paper, Digital Playgroundz, discussed such an approach. See Dan Gregor, Ondrej Prucha, Jakub Rocek, and Josef Kortan, Digital playgroundz (ACM SIGGRAPH 2017 V R Village (SIGGRAPH '17), ACM, New York, N.Y., USA, Article 4, 2 pages. DOI: https://doi.org/10.1145/3089269.3089288). Further afield is Cassinelli et al., which uses a steerable laser rangefinder to track a finger in midair. See Álvaro Cassinelli, Stéphane Perrin, and Masatoshi Ishikawa, *Smart laser-scanner for 3D humanmachine interface* (CHI '05 Extended Abstracts on Human Factors in Computing Systems (CHI EA '05). ACM, New York, N.Y., USA, 1138-1139. DOI=http://dx.doi.org/10.1145/1056808.1056851).

BRIEF SUMMARY OF THE INVENTION

In one exemplary embodiment, the present invention is a sensing system for sensing a host surface area and at least one associated input. The sensing system according to this embodiment comprises a computing device, a processing unit incorporated into the computing device, a range finding sensor and a user interface. The a range finding sensor of this embodiment is incorporated into the computing device and configured to provide an input channel and to operate parallel to the host surface area, whereby the range finding sensor can sense at least one input within a predetermined region around the computing device and can generate data descriptive of the at least one input. The computing device is proximately located to the surface and, depending upon the orientation of the surface (e.g., horizontal, vertical, or other), the device can rest against, sit upon or be mounted upon the surface. The computing device can be a smart computing device, and the range finding sensor can be located in varying parts of the computing device, including, without limitation, a base, a portion of the computing devices that is the closest to the host surface area, a top region or elsewhere.

The present invention further includes a method of object sensing. This method includes the initial step of providing a sensing system for sensing a host surface area and at least one associated input. The sensing system of this embodiment comprises a computing device, a processing unit incorporated into the computing device, a range finding sensor and a user interface. The range finding sensor of this embodiment is configured to provide an input channel and to operate parallel to the host surface area, whereby the range finding sensor can sense at least one input within a predetermined region around the computing device and can generate data descriptive of the at least one input. This method embodiment of the present invention, also includes the following steps: (1) using the range finding sensor to scan the predetermined region to detect an input within the region; (2) using the range finding sensor to gather data on the input; (3) using the processing unit to cluster the data into a coherent contour; (4) using the processing unit to classify the coherent contour; (5) using the processing unit to store the coherent contour; and (6) using the processing unit to send instructions to the user interface. Another embodiment of the present invention is directed to a device for sensing a host surface area and at least one associated input. The device according to this embodiment includes a computing device, a processing unit incorporated into the computing device, a range finding sensor and a user interface. The range finding sensor of this embodiment is incorporated into the computing device and configured to provide an input channel and to operate parallel to the host surface area, whereby the range finding sensor can sense at least one input within a predetermined region around the computing device and can generate data descriptive of the at least one input, wherein the input is selected from the group consisting of a hand input, one or more persons, one or more events and one or more objects. Additionally, according to this embodiment of the present invention the user interface comprises at least one interactive application response to the input.

In other embodiments, the present invention includes a process that clusters range finding data points into single objects and uses machine learning to label points as fingers, hands, people, or inanimate objects. Additionally, one embodiment of the present invention includes the ability to recognize objects from a library of pre-trained known objects (which can then be used to power interactive experiences). Another embodiment of the present invention recognizes hand shapes from a library of pre-trained known hand poses and gestures, which can then be used for interactive control. A further embodiment of the present invention utilizes a process that tracks finger clusters to enable touch input on ad hoc surfaces, which can then be used for interactive control.

BRIEF DESCRIPTION OF THE SEVERAL VIEWS OF THE DRAWINGS

For the purpose of facilitating understanding of the invention, the accompanying drawings and description illustrate preferred embodiments thereof, from which the invention, various embodiments of its structures, construction and method of operation, and many advantages, may be understood and appreciated. The accompanying drawings are hereby incorporated by reference.

FIGS. 7A through 7D show another embodiment of the present invention directed to an enhanced thermostat;

FIGS. 8A through 8D show a light switch according to yet another embodiment of the present invention;

FIGS. 9A through 9F illustrate a recipe helper application of the present invention;

FIGS. 10A through 10D show a music player application of the present invention;

FIGS. 11A through 11J show ten possible static hand poses and their corresponding computed features, which are utilized by one embodiment of the present invention;

FIG. 13 is a confusion matrix for kitchen objects according to one embodiment of the present invention (the object keys are shown in FIG. 12);

FIG. 14 is a confusion matrix for workshop objects according to one embodiment of the present invention (object keys are shown in FIG. 15);

FIGS. 15A through 15R show a variety of workshop objects that may be used for one embodiment of the present invention for object recognition evaluation;

DETAILED DESCRIPTION OF THE INVENTION

The present invention will be understood more readily by reference to the following detailed description of the invention and the accompanying figures, which form a part of this disclosure. This invention is not limited to the specific devices, methods, processes, elements or parameters described and/or shown herein and the terminology used herein is for the purpose of describing particular embodiments and is by way of example only and not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Various embodiments of the present invention include a system 10, method, device and category of computing devices, smart devices, augmented computing devices, internet connected computing devices, IoT computing devices, commodity consumer devices and/or other IoT devices (collectively herein referred to as an "computing device(s)"), together with an associated method, that collectively enrich IoT experiences with rich touch and object sensing, offer a complementary input channel, offer increased contextual awareness, and enable the various embodiments of the present invention to answer questions and interact in novel ways.

Figures 1A, 1B, 1C, 1D, 1E:
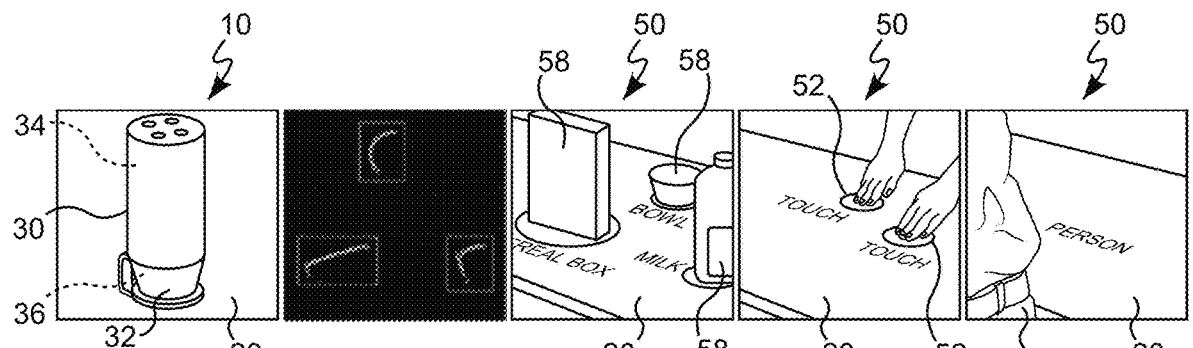
FIGS. 1A through 1E show one embodiment of the present invention as a smart speaker with a range finding sensor.

One embodiment of the present invention is shown, without limitation to other embodiments, in FIGS. 1A through 1E. For sensing, this embodiment of the present invention incorporates a range finding sensor 36, such as, but not limited to, LIDAR, into the base 32 of an computing device 30 (FIG. 1A), providing an expansive ad hoc plane of sensing just above the host surface area 20 upon which the device 30 rests or the host surface area 20 to which the device 30 is proximately located. Next, the present invention performs clustering, tracking and classification, as shown in FIG. 1B. The present invention can recognize and track a wide array of objects 58 (FIG. 1C), including finger touches (FIG. 1D) and hand gestures, both of which are types of hand inputs 52. The present invention also can track people 54, estimate which way they are facing and estimate their direction and/or orientation (FIG. 1E). It will be obvious to one skilled in the art that there are an unlimited number and types of things, actions, or events that can be sensed by the various embodiments of the present invention. These things, actions and events, include but not limited to people, triggering events or a sequence of events, actions, motions, hand and finger gestures, finger touches, hand and finger shapes or positions, and any and all types of physical objects, which are herein referred to categorically as "inputs" 50. An event 56 may include but not be limited to (a) placing an object 58 within the predetermined region, (b) removing an object 58 from the predetermined region, (c) placing and then removing an object 58 within the predetermined region and/or (d) moving an object 58 within the predetermined region. New capabilities of the various embodiments of the present invention can be used to power novel and contextually-aware interactive experiences.

Figure 18:
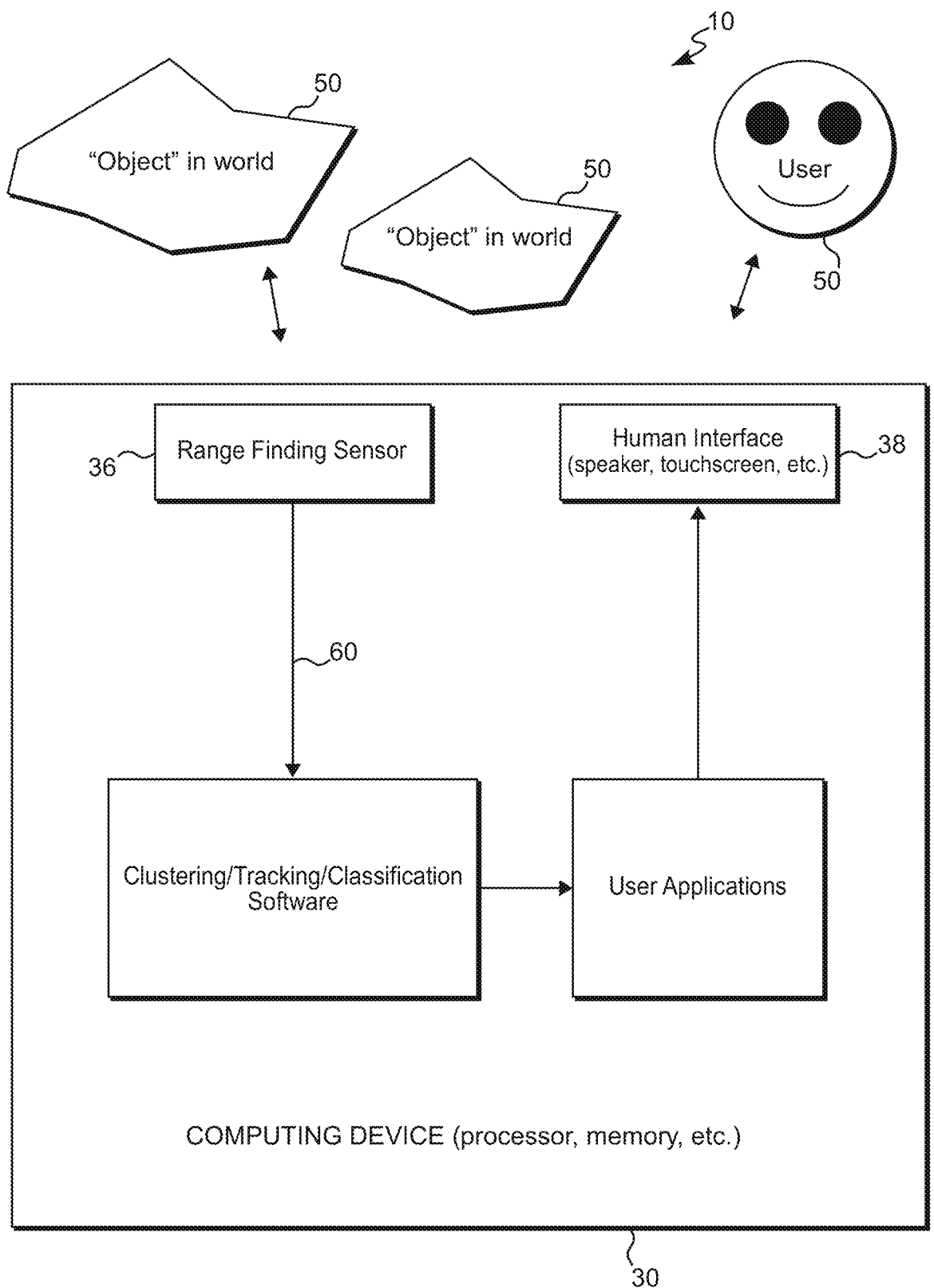
FIG. 18 is a broad outline of the parts of one embodiment of the present invention.

As shown in FIG. 18, the present invention incorporates the elements of a range finding sensor technology 36, clustering/tracking/classification software, one or more user applications and at least one human user interface 38 into various systems, devices and methods to enable a computing device 30 to sense and identify inputs 50 within a specified region of the device 30 on the host surface area 20. There are a variety of systems, methods and devices that encompass the basic functions outlined in FIG. 18, and a sampling of those are discussed herein in more detail for the purpose of explaining the invention and not limiting the scope of the invention.

Figure 17:
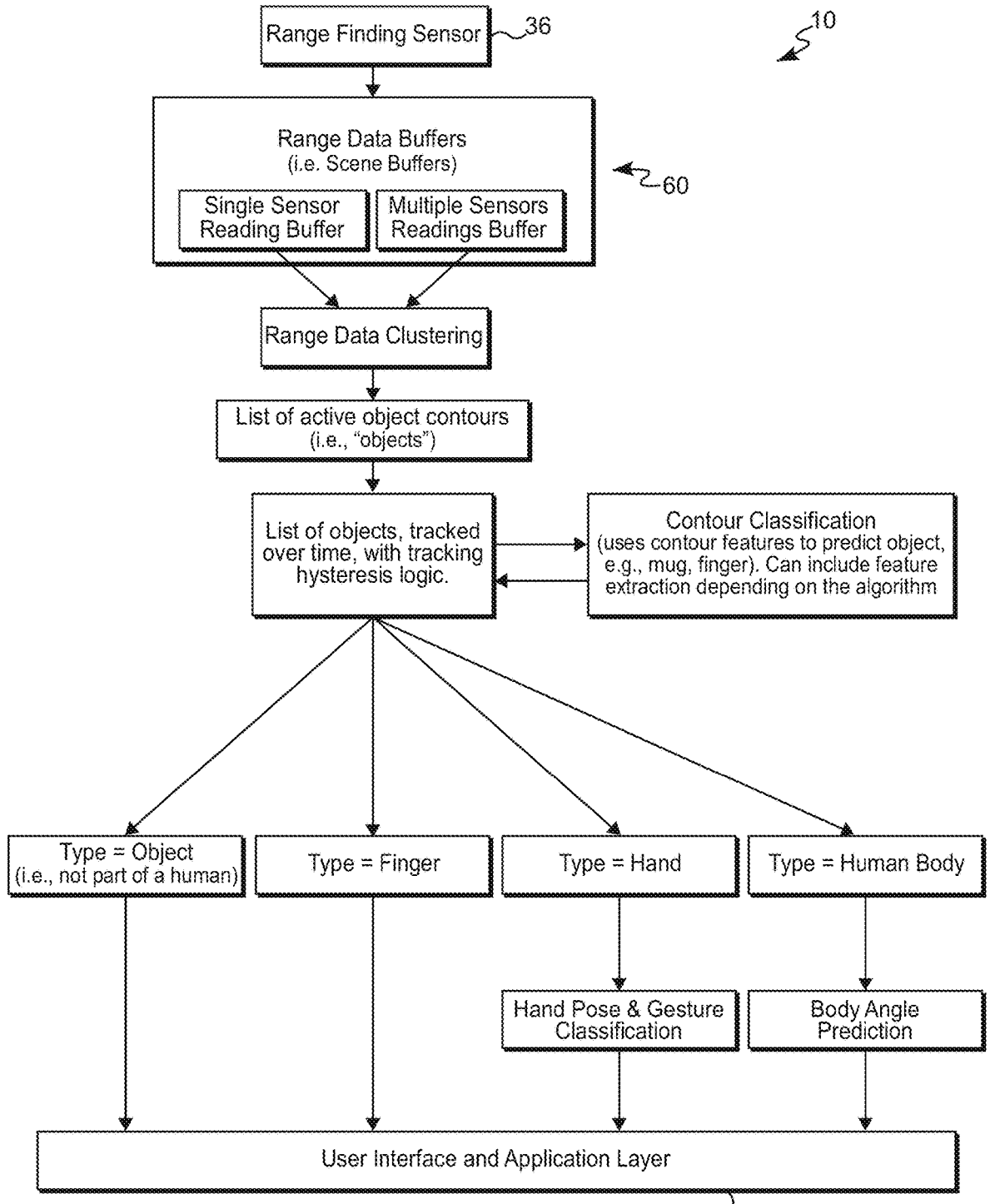
FIG. 17 is a flowchart of a method according to one embodiment of the present invention.

As broadly outlined in FIG. 17, various system, method and device embodiments of the present invention involve the following components and steps. First, a computing device 30 employs a range finding sensor 36 (nonlimiting examples include LIDAR, a depth camera, sonar, radar, etc.) The range finding sensor 36 is proximately located to a host surface area 20, which can be a horizontal surface (such as a table, the top surface of built-in or free-standing furniture, a floor, etc.), a vertical surface (such as a wall, a vertical side of a built-in or free-standing piece of furniture, a door, etc.) or another surface of any orientation. The range finding sensor 36 may sit directly upon, rest against or be mounted upon the host surface area 20, or sensor 36 can be above or removed from the host surface area 20. The distance between the range finding sensor 36 and the host surface area 20 can vary according to the design of the system, the device and/or the components used therein. However, the distance between the range finding sensor 36 and the host surface area 20 should be small enough to allow the range finding sensor 36 to scan and identify inputs 50 that are on or proximate to the host surface area 20 and within a set or predetermined region around the computing device 30. In a preferred embodiment of the present invention, the range finding sensor 36 will be no more than 25 cm above the host surface area 20. Additionally, in a preferred embodiment of the present invention the range finding sensor 36 will be able to scan a distance from 0 to 5 meters in all directions from the computing device 30, although the predetermined region may be smaller than that area.

Additionally, the range finding sensor 36 scans a predetermined region around the computing device 30 for inputs 50. Upon identifying and gathering data 60 on an input 50 within the set region, the processing unit 34 of the various embodiments of the present invention stores that data 60. In some embodiments, this data 60 may be stored using at least one range data buffer. Different embodiments of the present invention may use different numbers of buffers.

Next, as shown in FIG. 17, the data 60 in the buffers is clustered into coherent contours (i.e., continuous or otherwise as recognized as being together as a single entity). This information is used to produce a list of coherent inputs 50 or objects 58, which is maintained in memory (i.e., instead of thousands of range points, the present invention now has a certain number of "library objects", loosely defined). This list might be generated ten times per second or more. Alternatively, in some embodiments of the present invention, this list may be partially or fully prepopulated with library objects. Again, these steps occur in the processing unit 34 of the various embodiments of systems and devices of the present invention.

The next step in the various embodiments of the present invention (also shown in FIG. 17) is the receipt of the list of contours (many times per second) and the use of this data 60 to provide tracking over time. As a nonlimiting example, if a banana (as an input 50 and, more specifically, an object 58) exists in frame 100 and then in frame 101 there is a similar contour in roughly the same position, the invention is programmed to conclude that it is the same banana, and the invention will update the position and contour of the banana as opposed to making a new banana. This process also has the responsibility of providing some tracking hysteresis. For instance, if the banana in frame 102 is missing for some reason, but then back again in frame 103, the process will ignore that sensor blip and say the banana was there the entire time. This extra logic makes apps much more stable. Again, these steps occur in the processing unit 34 of the various embodiments of systems and devices of the present invention.

According to the broad description of the present invention, contours are periodically sent for classification (i.e., what is that contour?) This can happen only once, the first time the contour appears, or it can be run occasionally, or even every frame. The classification result is saved back into the object meta data (the previously described step of receiving the contour data).

As outlined in FIG. 17, depending upon the type of "object" the contour is, there might be extra logic. For instance, if the embodiment of the present invention detects hands (as an input 50 and, more specifically, a finger touch), it can be programmed to run a second classification process that determines the hand pose (e.g., heart shape, V-shape, etc.). If the embodiment of the present invention detects a human body (as an input 50 and, more specifically, a person 54), it can be programmed to run a second classification for estimating body angle. Again, these steps occur in the processing unit 34 of the various embodiments of systems and devices of the present invention.

Finally, all of this data 60 is passed to one or more end user applications and user interfaces 38. These user interfaces 38 could have projected graphics, graphics on a screen, be voice based, or have not output at all (e.g., a smart lock that unlocks when given the right gesture). User interfaces 38 encompass a wide variety of interactive applications that respond to the various human inputs 50 by altering a behavior of the computing device 30, triggering a behavior of the computing device 30, or both. These user interfaces 38 also may include altering and/or triggering behaviors in interactive applications that are separate from but connected to the computing devices 30 (interconnected computer applications). These interactive applications may be integral to the sensing system 10 or sensing device or they may be remote from the system and device and connected via a wireless connection such as WIFI and Bluetooth (again, examples of interconnected computer applications). For example, a behavior or event could be triggered in the cloud or on another platform (such as Amazon.com), etc. Some example user interfaces 38 are illustrated in FIGS. 7, 9, 10, 17 and 18.

One exemplary embodiment of the present invention incorporates LIDAR as a range finding sensor 36 into a computing device 30 to create a plane of sensing proximate and generally parallel to the host surface area 20 associated with the computing device 30. A LIDAR-enabled computing device 30 according to the present invention will also follow the processes outlined in FIGS. 17 and 18. This embodiment of the present invention clusters sensor readings into contiguous library objects. Next, the present invention uses machine learning to assign types, including but not limited to hands (a hand input 52) and objects 58, such as bowls or tools. This embodiment of the present invention also tracks clusters over time. In other related embodiments of the present invention, users can specify an interactive region during set-up by touching the corners or perimeter of an area, after which only interactions in that region are tracked. With this data 60, the present invention can enable buttons on host surface areas 20 and also track continuous motion (another type of hand input 52) for things like a slider. The present invention also recognizes hand shapes 52 for gesture control, and it recognizes and tracks a wide variety of objects, tools, and materials (collectively referred to as objects 58). The present invention also can distinguish objects 58 that it does not know so as to avoid false positives. Finally, the present invention can track people 54 as a special class of inputs 50. One embodiment of the present invention uses a classifier to predict if the front, back or side of a user (a person 54) is seen. When a user is facing the computing device 30, the present invention computes an estimation of his or her direction. One embodiment of the present invention is programmed to only accepts directions or input when the user is facing the computing device 30. Such capabilities enable a wide range of experiences not possible in today's IoT devices.

Example Hardware for One Possible Embodiment

One embodiment of the present invention incorporates the use of a Slamtech RPLidar A2, which measures 7.6 cm wide and 4.1 cm tall, as the range finding sensor 36. This is sufficiently compact to fit under most computing devices 30 (e.g., speakers, thermostats). However, it will be apparent to one skilled in the art that the present invention can be designed to incorporate a wide variety of LIDAR technologies and many other similar range finding sensors 36, including but not limited to cameras, depth cameras, radar and sonar. Additionally, range finding sensors 36 for the various embodiments of the present invention may include the use of one sensor that detects along more than one vector running out from the computing device 30. Alternatively, range finding sensors 36 for the various embodiments of the present invention may include the use of multiple sensors with each individual sensor detecting along one vector running out from the computing device 30, or any combination of various types of sensors 36. Range finding sensors 36 include analog and digital sensors. The type of LIDAR technology used may vary depending upon the computing device 30 in which it is being incorporated and the goals or tasks in which the computing device 30 will be asked to engage. For one example embodiment, the computing device 30 with a range finding sensor 36 is suspended upside down from an acrylic frame to bring the sensing plane to 6.0 mm above the base host surface area 20. In this embodiment, the sensor 36 may be fully integrated into the base 32 of the computing device 30, with a strip of infrared translucent material being used to both hide and protect the sensor 36. One skilled in the art will understand that there are many ways of incorporating range finding sensors 36 into computing devices 30 to enable sensing of the host surface area 20 and, optionally, area surrounding the computing device 30.

Additionally, while some embodiments of the present invention will function best with the range finding sensor 36 located in the base 32 of the computing device 30, it will be obvious to one skilled in the art that the range finding sensor 36 can be located in a variety of locations in and on the computing device 30 and the placement of the range finding sensor 36 will be determined by how the computing device 30 is intended to be used, the environment surrounding it and the goals of the sensing system and/or device, among other factors. In many embodiments of the present invention, the range finding sensor 36 will operate in a plane of sensing parallel and proximate to the host surface area 20 to be monitored, together with inputs 50 associated with the surface. All such methods for incorporating LIDAR and other range finding sensors 36 are including within the scope of and claimed by the present invention.

Multi-Resolution Sampling for One Example Embodiment:

The Slamtech RPLidar A2 can sense up to 12 m (15 cm minimum) with its Class 1 (eyesafe), 785 nm (infrared) laser. Distance sensing is accurate to within ±3 mm at distances under 3 meters. The device driver is modified to rotate at maximum speed (12 Hz) and maximum sampling rate (4 kHz), providing an angular resolution of ~1.1°.

Figures 2A, 2B:
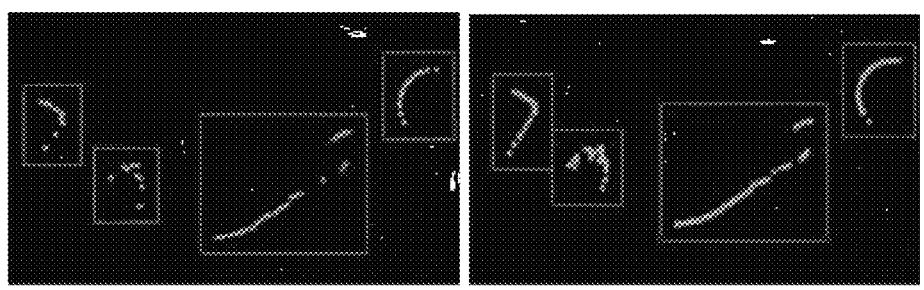
FIGS. 2A and 2B show a multi-resolution sampling step for the present invention.

FIGS. 2A and 2B show data 60 gathered by one embodiment of the present invention. The objects 58 shown from left to right in FIGS. 2A and 2B are mineral spirits, a hand (which is a hand input 52), a hammer and a bowl. Each rotational pass is slightly misaligned, offering the ability to subsample object contours by integrating data 60 from multiple rotational passes (as shown in FIGS. 2A and 2B). FIG. 2B has a longer integration period than FIG. 2A. This presents an interesting tradeoff: on one end of the spectrum, the present invention can capture sparse contours that update as quickly as a single rotation (FIG. 2A). On the other end, the present invention can integrate many rotational passes to collect high quality, dense contours (FIG. 2B), which also permits the capture of smaller objects 58 at longer distances. This, of course, incurs a non-trivial lag penalty, and also leaves behind "ghost" points if an object 58 is moved.

Fortunately, the best of both worlds can be achieved in one embodiment of the present invention by maintaining two independent polar point cloud buffers, with different integration periods (FIGS. 2A and 2B). First is a "finger" buffer, which integrates five rotations (i.e., 2.4 FPS) for an effective angular resolution of ~0.5°. This integration period offers the best balance between robustly capturing small fingers, while still offering an interactive framerate. A second, "object" buffer, integrates 16 rotational passes (i.e., 0.75 FPS) for an effective angular resolution of ~0.2°, which strikes a balance between update rate and object contour quality.

Clustering for One Example Embodiment

Point clouds are clustered by using a variant of the adaptive breakpoint detection ("ABD") scheme introduced by Borges et al. (Geovany Araujo Borges and Marie-Jose Aldon, *Line extraction in 2D range images for mobile robotics*, Journal of Intelligent & Robotic Systems, 40(3): 267-297, 2004). Two points are part of the same cluster if their Euclidean distance falls below a dynamic, distance-based threshold, defined by the following formula:

$$t_{breakpoint}=a*D^2+b*D+c$$

where D is the distance in mm, and a, b, and c are empirically determined coefficients. These values are computed ($a=5e^{-5}$, $b=0.048$, and $c=18.46$) by capturing pilot data 60 in four commonplace environments with existing objects 58 present. The output of clustering is an array of objects, each containing a series of constituent points.

Figure 3A:
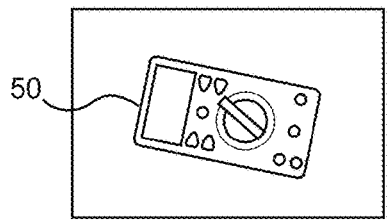
FIGS. 3A through 3C illustrate how, for each cluster, the present invention transforms all points into a local coordinate system, rotates, and then resamples them for feature extraction.
Figure 3B:
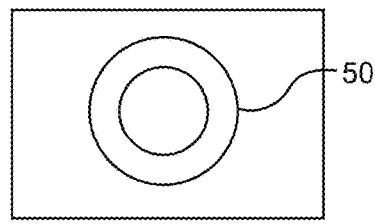
Figure 3C:
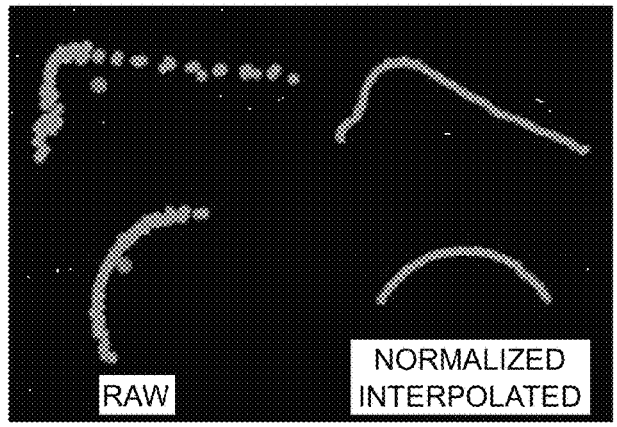

Feature Extraction for One Example Embodiment:

As shown in FIGS. 3A through 3C, for one embodiment of the present invention, once individual points have been grouped into a single cluster, all points are transformed into a local coordinate system, the point cloud is rotated to align with the 0°-axis of the sensor 36, and the contour is resampled into a 64-point path for feature extraction. This helps homogenize object contours into a distance-from-sensor and rotation-invariant form (as shown in FIG. 3C). The features include cluster bounding box area, angle between centroid, relative angle between cluster points and residuals (again shown in FIGS. 3A through 3C).

Then, for this embodiment, a series of cluster-level features is generated that characterizes objects 58 for recognition. Specifically, the following features are computed for each cluster: area of bounding box, real world length of path, relative angle between consecutive points, and angles between each point relative to the path centroid. Next, a line is drawn between the first and last point in a path, and the residuals for all intermediate points are computed, from which seven statistical values are derived: min, max, mean, sum, standard deviation, range, and root-mean squared (RMS). Finally, every fourth residual is taken and its ratio against all others is computed.

Object Classification & Unknown Object Rejection for One Example Embodiment:

For one embodiment of the present invention, before classification of clusters can occur, a model must be trained on inputs 50 or objects 58 of interest. As object contours can be quite different across viewpoints, it is important to expose all sides of an object 58 to the present invention during training. A database of all previously seen object contours (featurized data) is maintained, which allows the present invention to compute an incoming contour's nearest neighbor (linear distance function). If the contour is below a match threshold, it is simply ignored. If one or more matches are found, the contour proceeds to object classification. Rather than use the nearest neighbor result, one embodiment of the present invention uses a random forest classifier (in Weka, batch size=100, max depth=unlimited, default parameters). It will be obvious to one skilled in the art that a variety of different classification methods can be used for this purpose and all such methods are included in the present invention.

Cluster Tracking for One Example Embodiment

Feature computation and classification occurs once, when a cluster is first formed. From that point on, the cluster is tracked across frames, and the classification result is carried forward. A persistent cluster ID is also important for tracking finger stokes and detecting gestures. For tracking, one embodiment of the present invention uses a greedy, Euclidean distance pairwise matching approach with a distance threshold. Although simple, it works well in practice. This embodiment of the present invention's tracking pipeline is also responsible for generating on-down, on-move and on-lift events that trigger application-level interactive functions. It will be obvious to one skilled in the art that other methods of cluster tracking can be used and all such methods are included in the present invention.

Touch Input and Gesture Recognition of One Example Embodiment

Figures 4A, 4B:
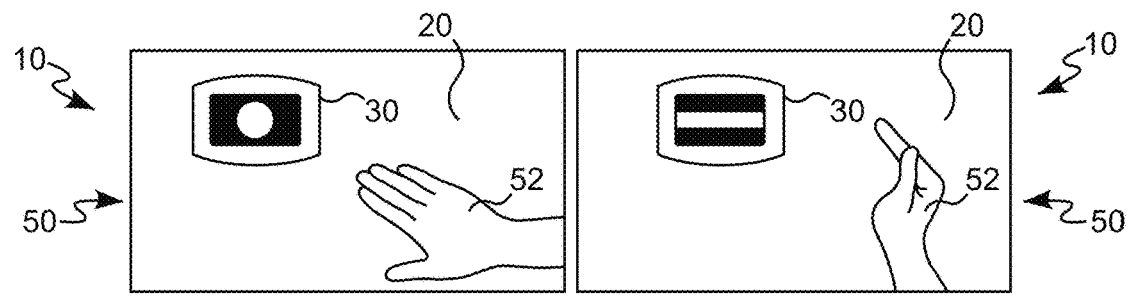
FIGS. 4A through 4D show one embodiment of a device according to the present invention, which is enabled with touch and gesture recognition.
Figures 4C, 4D:
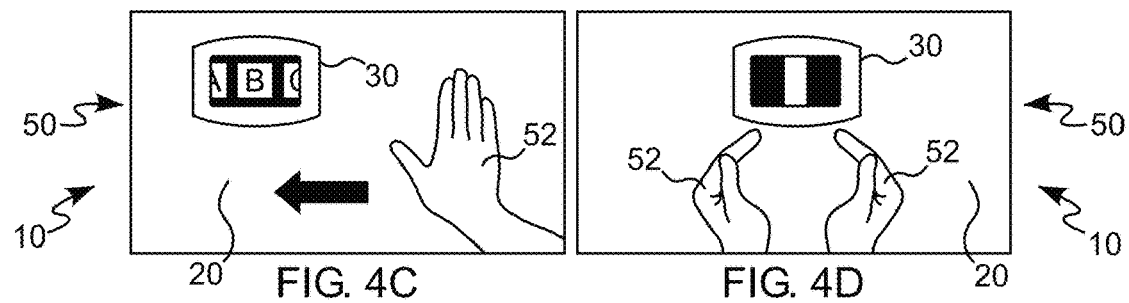
Figures 5A, 5B, 5C:
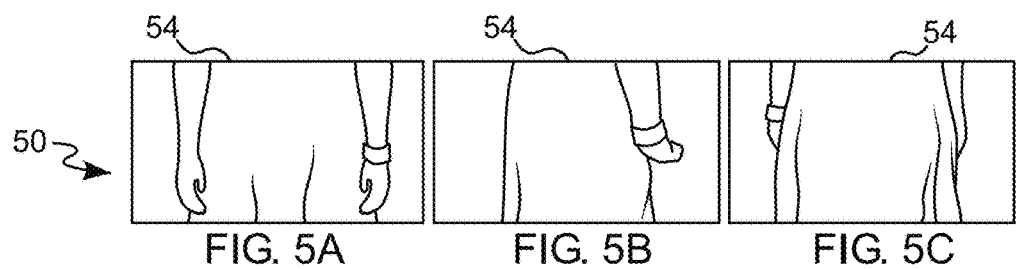
FIGS. 5A through 5F show how one embodiment of the present invention detects people, including the different sides of their bodies, whose signals are quite distinctive.
Figures 5D, 5E, 5F:
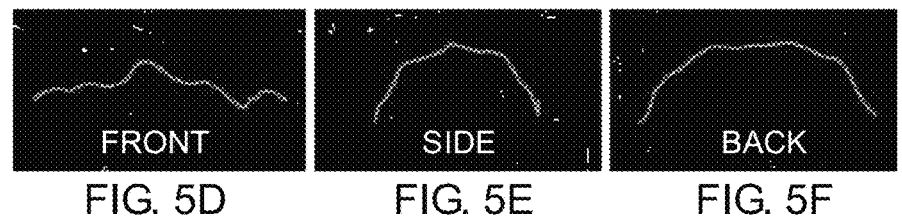

Recognition of finger and finger touches as hand inputs 52 is handled identically to other objects 58 (as it has a distinctive shape and size), except that one embodiment of the present invention uses a high framerate "finger" buffer. However, the present invention treats recognition of finger inputs 52 as a special class of inputs 50. Touches 52 to a host surface area 20 result in conventional interactor events (e.g., on touch down). As noted above, one embodiment of the present invention maintains a movement history of 1.0 seconds for all clusters. In the case of finger inputs (a type of hand input 52), this motion vector can be used for stroke gesture recognition. This embodiment of the present invention supports six unistroke gestures: up, down, left, right swipes, clockwise, and counter-clockwise rotations. FIG. 4 shows a few of the possible touches and gestures, (both hand inputs 52) that are recognized by this embodiment of the present invention. This embodiment supports a range of modalities (created or activated by hand inputs 52), including buttons (FIG. 4A), rotational control (FIG. 4B), carousels (FIG. 4C), and manipulation via two-handed continuous motions (FIG. 4D). One embodiment of the present invention incorporates a modified $1 recognizer for unistroke recognition. It will be obvious to one skilled in the art that many different types of recognizers and recognizer technologies may be incorporated into the present invention to accomplish this task. It also will be obvious to one skilled in the art that there are an almost infinite number of possible touches and gestures that the present invention can be programed to identify. All such possibilities are included within the scope of the present invention.

In addition to motion gestures, the present invention can be programmed to recognize at least ten static hand postures (as hand inputs 52), as shown in FIGS. 11A through 11J: point, all fingers together, flat palm, fist, wall, corner, stop, 'V', circle, and heart. As these are whole-hand shapes, as opposed to moving figures, the present invention registers these contours in its system in the exact same manner as physical objects 58. Again, it will be apparent to one skilled in the art that the present invention can incorporate many hand shapes beyond the ten presented here, and all such hand shapes are encompassed by this invention.

Person Tracking and Direction Estimation of One Example Embodiment:

Finally, embodiments of the present invention also be programmed to classify people 54 as another special input 50 class. Human contours are large, move in characteristic trajectories, and are markedly different from inanimate objects (see FIGS. 5A through 5F and 6A through 6F). These heuristics can be leveraged for person tracking.

Figures 6A, 6B, 6C:
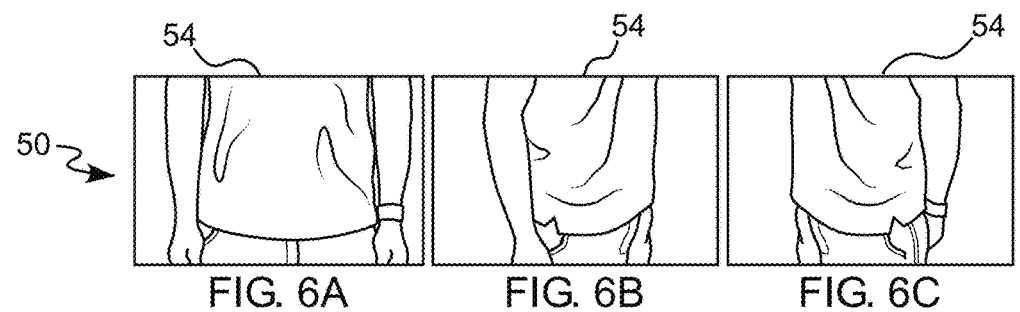
FIGS. 6A through 6F show that once a person is detected and determined to be front facing, one embodiment of the present invention performs an extra processing step, where it estimates direction.
Figures 6D, 6E, 6F:
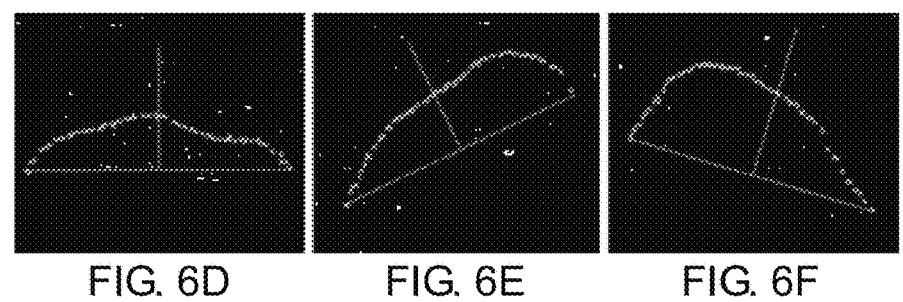
Figure 12K:
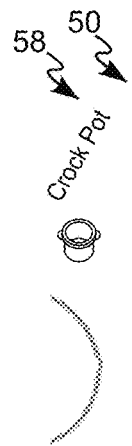
FIGS. 12A through 12T show a variety of kitchen objects, which are utilized by one embodiment of the present invention.
Figure 12L:
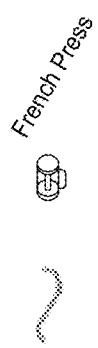
Figure 12M:
Figure 12N:
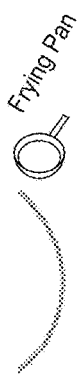
Figure 12O:
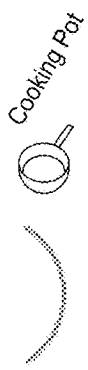
Figure 12P:
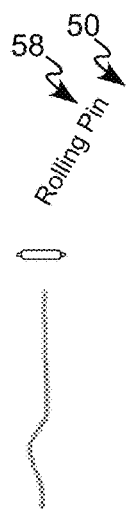
Figure 12Q:
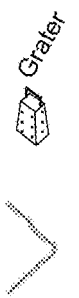
Figure 12R:
Figure 12S:
Figure 12T:

In addition, various embodiments of the present invention can incorporate many subclasses, including but not limited to person front, back, and side (shown in FIGS. 5A through 5F). If the present invention detects that a person 54 is facing front, it can be programmed to perform an extra processing step to estimate which direction they are facing (shown in FIGS. 6A through 6F). To compute direction, the present invention projects a line between the first and last points of the "human" cluster, and projects an orthogonal vector that originates from the midpoint (FIGS. 6D through 6F). Knowing a person's direction can be useful in different way, including but not limited to being used as an extra contextual channel to enable devices according to the present invention to discern more explicit user intention (e.g., accepting voice commands only when a person is nearby and facing the device). From this data, it is also possible to link touch points to a person, as previously shown by Annett and colleagues (Michelle Annett, Tovi Grossman, Daniel Wigdor, and George Fitzmaurice, *Medusa: a proximity-aware multi-touch tabletop*, In Proceedings of the 24th annual ACM symposium on User interface software and technology (UIST '11). ACM, New York, N.Y., USA, 337-346).

Defining the Interactive Area of One Example Embodiment

The planar sensing offered by range finding sensors 36 can easily identify concave adjoining surfaces, such as the transition from a countertop to backsplash, or desk to wall. However, convex discontinuities, such as the outer edge of countertop or desk, are typically invisible to such sensors 36. This edge represents an important functional boundary between "human" space (floors) and "object" space (raised surfaces). For example, a person is likely to see a cross-section of a human torso out in a room, but not on a countertop.

Instead of attempting to have the system 10 learn this boundary automatically, by tracking where objects 58 or inputs 50 appear over time, one embodiment of the present invention, incorporates a rapid initialization procedure, where users are requested to touch the outer perimeter of a work host surface area 20, on which the present invention computes a convex hull. An alternative method of the present invention is to specify a fixed interactive region (a predetermined region), e.g., 1 meter. It will be obvious to one skilled in the art that there are other ways to define an interactive region and all such methods are included in the present invention.

Non-Limiting Example Embodiments

As discussed previously, the present invention enables at least six input modalities: virtual widgets, static hand gestures, finger motion gestures, object recognition, people tracking, and person direction estimation. These fundamental capabilities can be incorporated into a wide variety of end user applications, which can be accessed or utilized via a wide variety of user interfaces 38. In this section four example applications illustrate potential uses, for both walls and horizontal surfaces. It will be apparent to one skilled in the art that there are many other applications that fall within the scope of this invention.

Thermostat:

One embodiment of the present invention is an enhanced thermostat that responds to finger touches 52 within a specified region, such as 1 meter radius (FIG. 7) or 2×2 meter square. Picture frames, a person leaning against the wall, and similar non-finger objects are ignored. For the purposes of this embodiment, tapping the wall wakes the computing device 30 (FIG. 7A) to display the current temperature, whereas a longer dwell (FIG. 7B) reveals a more detailed HVAC schedule. Clockwise and counter-clockwise circling motions (FIG. 7C) adjust the desired temperature up or down. Finally, swipes to the left and right (FIG. 7D) navigate between different modes, such as eco mode, away from home, fast heat, and fast cool. While these gestures and touches correspond to suggested thermostat functions, any similar gestures and touches could be used within the scope of the present invention and they could be assigned to any device functions and still be within the scope of the present invention.

Lightswitch:

Another embodiment of the present invention, which is shown in FIG. 8A, is an augmented lightswitch. Instead of a physical toggle button, all interactions are driven through touches to the wall. A tap is used to toggle lights on or off (FIG. 8B). Sliding up and down the wall functions as a dimmer control (FIG. 8D). Finally, detection of left and right swipes can be used to move between lighting presets, such as incandescent, daylight, evening, and theater (FIG. 8C). While these gestures and touches correspond to suggested lightswitch functions, any similar gestures and touches could be used within the scope of the present invention and they could be assigned to any device functions and still be within the scope of the present invention.

Recipe Helper:

A third embodiment of the present invention is an augmented smart device 30 (for example Amazon Alexa™) (shown in FIG. 9). It will be obvious to one skilled in the art that this augmentation can be applied to any similar computing device 30 and is not limited to the Alexa™. The Alexa™ can be programmatically control through its Alexa Skills Kit API. As shown in FIGS. 9A through 9F, one embodiment of the present invention is situated on a kitchen countertop and employs a recipe app demo that can recognize common kitchenware, including mixing bowls, mortar, chopping board, and measuring cups of various sizes. If the recipe app requests an object as part of a recipe step (FIG. 9A) (e.g., "retrieve the mixing bowl"), it automatically advances to the next instruction once that item is placed on the host surface area 20 (FIG. 9B). The reference numbers shown in FIG. 9A are applicable to FIGS. 9B through 9F, where similar components are illustrated in those figures, but for clarity not every reference number was repeated in each figure. Likewise, questions with an ambiguous object 58 are assumed to be the last item that appeared or moved by the user. As an example, a "how many [units] are in this?" command is implemented. For example, the user asks, "how many ounces in this?" after putting down a measuring cup (FIG. 9C). Swiping left and right allows rapid navigation through the recipe steps, including replaying the current step (FIGS. 9D and 9E). Finally, when a user is finished with a step (e.g., mortar and pestle lifted, which could be classified as an event 56), the system 10 can automatically advance (FIG. 9F). While these gestures and touches correspond to suggested smart device functions, any similar gestures and touches could be used within the scope of the present invention and they could be assigned to any device functions and still be within the scope of the present invention.

Music Player:

A fourth embodiment of the present invention, shown in FIGS. 10A through 10D, is a music player using an instrumented Google Home (or any similar IoT device). This scans for phones resting nearby on the same host surface area 20 (FIG. 10A), which is interpreted to be an explicit action by a user to connect the two devices. This is in contrast to e.g., automatic Bluetooth pairing, which might occur when the device is in the pocket of a nearby user. Once connected, music can be controlled by using the table's host surface area 20: tap to pause/play (FIG. 10B), left and right swipes to move between songs (FIG. 10C), left and right continuous motions to scrub inside of a song and sliding up and down to control volume. As noted earlier, smart speakers have trouble with spoken input when playing content. In one embodiment of the present invention, the music volume is momentarily halved when a user turns to face the Google Home, in anticipation of a spoken command. Finally, the present invention can also track the user's body and angle and listen to user commends (FIG. 10D) (without a wake-word) when it detects that the user is intentionally facing the device. While these gestures and touches correspond to suggested smart music device functions, any similar gestures and touches could be used within the scope of the present invention and they could be assigned to any device functions and still be within the scope of the present invention.

Research and Evaluation of One Example Embodiment

Research into one embodiment of the present invention answered four key questions: 1) What is this embodiment system's touch sensing accuracy? 2) How well does the system 10 recognize static and dynamic hand gestures? 3) What is the accuracy of object 58 detection across several commonplace use environments? 4) How accurate is person detection and body direction estimation?

For this research on this particular embodiment, 14 participants were recruited (4 female, mean age 29.2), from a public participant pool. The first four studies were conducted on a generic wooden table, offering an interaction host surface area 20 90×210 cm. One embodiment of the present invention was placed opposite participants, centered on the long edge of the table. To facilitate data 60 capture, a short-throw projector was installed above the table in order to render automated visual instructions and targets for participants to follow (calibrated to this particular embodiment's coordinate system).

Study #1: Touch Sensing:

To assess touch sensing accuracy of this embodiment of the present invention, a target acquisition task was designed, where participants were asked to touch the center of a randomly positioned crosshair (on a 14×6 grid, spaced 15 cm apart, 84 positions total). Users could use either hand interchangeably, and they were not required to remove accessories, jewelry, or make clothing adjustments. For each trial, the error between crosshair position vs. the touch tracker's position (i.e., cluster centroid) was measured. Since the touch tracking is dependent on surface area, two conditions were run: touch using a) multiple fingers vs. b) one finger. Across these two conditions, each participant performed 14×6×2 conditions=168 trials.

Across 14 users and 2,300 touch trials cumulatively, this embodiment of the present invention's system 10 achieved a mean touch accuracy error of 1.60 cm (SD=0.7 cm). A linear relationship was found between touch error and the target's distance from the sensor 36. There were no significant differences on measurement errors between multiple fingers vs. single finger touch, although false negative errors (i.e., misses) were seen on the single finger condition (i.e., 9.2% missed, SD=5.9%). No touches were missed for the multiple finger condition. The average distance for missed single-finger touches was 1.09 m (SD=0.1 m) and 97% of missed touches were 0.8 m away. Overall, these results show the feasibility of touch sensing on the present invention.

Study #2: Motion Gestures:

The present research also investigated how well this particular embodiment of the present invention could detect motion gestures. For this task, six directional swipes were defined: a) left, b) right, c) up, d) down, e) clockwise, and f) counterclockwise. Participants performed each gesture twice (in random order), on a 2×3 grid (same table). Similar to the previous study, users were free to use either hand. In total, this procedure yielded 6 gestures×2 repeats×6 grid locations×14 participants=1008 trials. Gesture detection was performed live.

Across 14 users and 1,008 cumulative gesture trials, the present invention system 10 was able to infer dynamic gestures with an accuracy of 97.3% (SD=1.7%). Most gestures achieved an accuracy >98% (most confusion on clockwise vs. down). Most errors occur at far distances, suggesting a slight accuracy decline as gestures are performed further away from the sensor 36 (consistent with findings from the previous study).

Study #3: Static Hand Postures:

Beyond motion gestures, the research into this embodiment of the present invention also sought to evaluate how well the present invention system 10 can detect static hand postures. For this task, users were asked to perform ten static hand postures, which included single- and two-handed gestures, as depicted in FIG. 11. This study was segmented into two parts: a) training and b) testing. In the training phase, users performed all ten gestures in random locations across the table host surface area 20, and an experimenter collected data 60 to train a machine learning model. In the testing phase, a model is trained, and gesture inference is performed live. Like the previous study, users were asked to perform all ten gestures (random order) on a 2×3, and the experimenter captured the system's 10 live prediction. For each grid location, each participant performed 10 gestures=60 trials. Gesture detection was performed live (i.e., no post-hoc algorithmic change), and the experimenter recorded the system's 10 prediction after each gesture was performed.

Across 14 users and 840 cumulative gesture trials, the present invention system 10 was able to infer static hand gestures with an accuracy of 96.0% (SD=3.01%). No significant difference between the gesture detection accuracy vs. location was found, likely owing to much larger surface area of static hand gestures.

Study #4: Body Angle:

Next, research on this embodiment of the present invention sought to evaluate how well the present invention system 10 can detect a person and their relative body angle. For this study, seven locations were equally spaced around the left, right, and bottom edges of the table. For each location, an ellipse (0.5 m diameter) was displayed indicating a target. The participant was instructed to move to the target, where the present invention then performed person detection. At the same location, a line was projected on the table host surface area 20, and participants were asked to align the center of their body towards the projected line (i.e., aligning the center of their hips, torso, nose, and head). The present invention then compares the angular difference between the target line and the predicted angle. This process was repeated three times per location, for a total of 21 trials per user. Similar to the previous studies, predictions were performed live.

Across 14 users and 294 trials, person tracking obtained 100% accuracy. Further, the system 10 of the present invention predicted body angle accuracy with a mean error of ±3.04° (SD=3.7°). No significant difference was found between the angle prediction vs. location. These results suggest that it is indeed possible to compute the angle of a user's body (albeit when the user is facing the sensor 36), unlocking novel applications that leverage user directionality as a parameter for device interaction.

Figures 15M, 15N, 15O, 15P, 15Q, 15R:
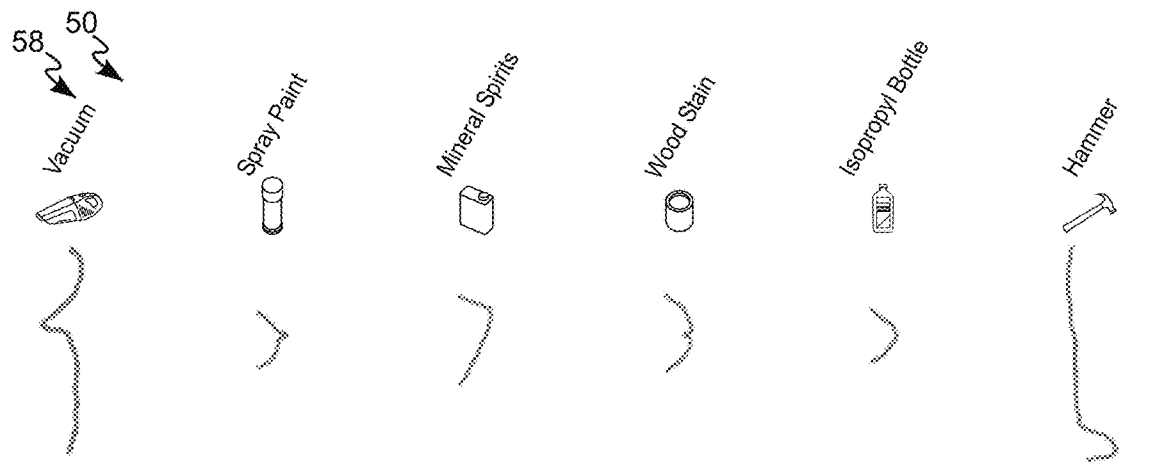

Study #5: Object Recognition:

In a final study (no users involved), this particular embodiment of the present invention was assessed for how well it can recognize objects 58, based solely on their contours. For this study, 38 everyday objects 58 were collected, some of which are shown in FIGS. 12 (A through T) and 15 (A through R) and split them into two functional categories: kitchen and workshop. The top row of FIG. 12 is the object name; the middle row is a photo of the object 58; and the bottom row is the visualization of the objects' normalized-interpolated features. Similarly, the top row of FIG. 15 is the object name; the middle row is a photo of the object 58; and the bottom row is the visualization of the objects' normalized-interpolated features. Like the previous study, this study was segmented into training and testing phases. In the training phase, data 60 was captured for each object 58 (different positions, different angles), with ~1000 instances per object 58. In the testing phase, one model per category was trained, and live predictions were performed. For each trial, a random object 58, position, and angle was selected, and an experimenter monitored the system's prediction. In all, a total of 1,140 trials were captured (38 objects×30 random angles and locations).

Figures 13, 14:
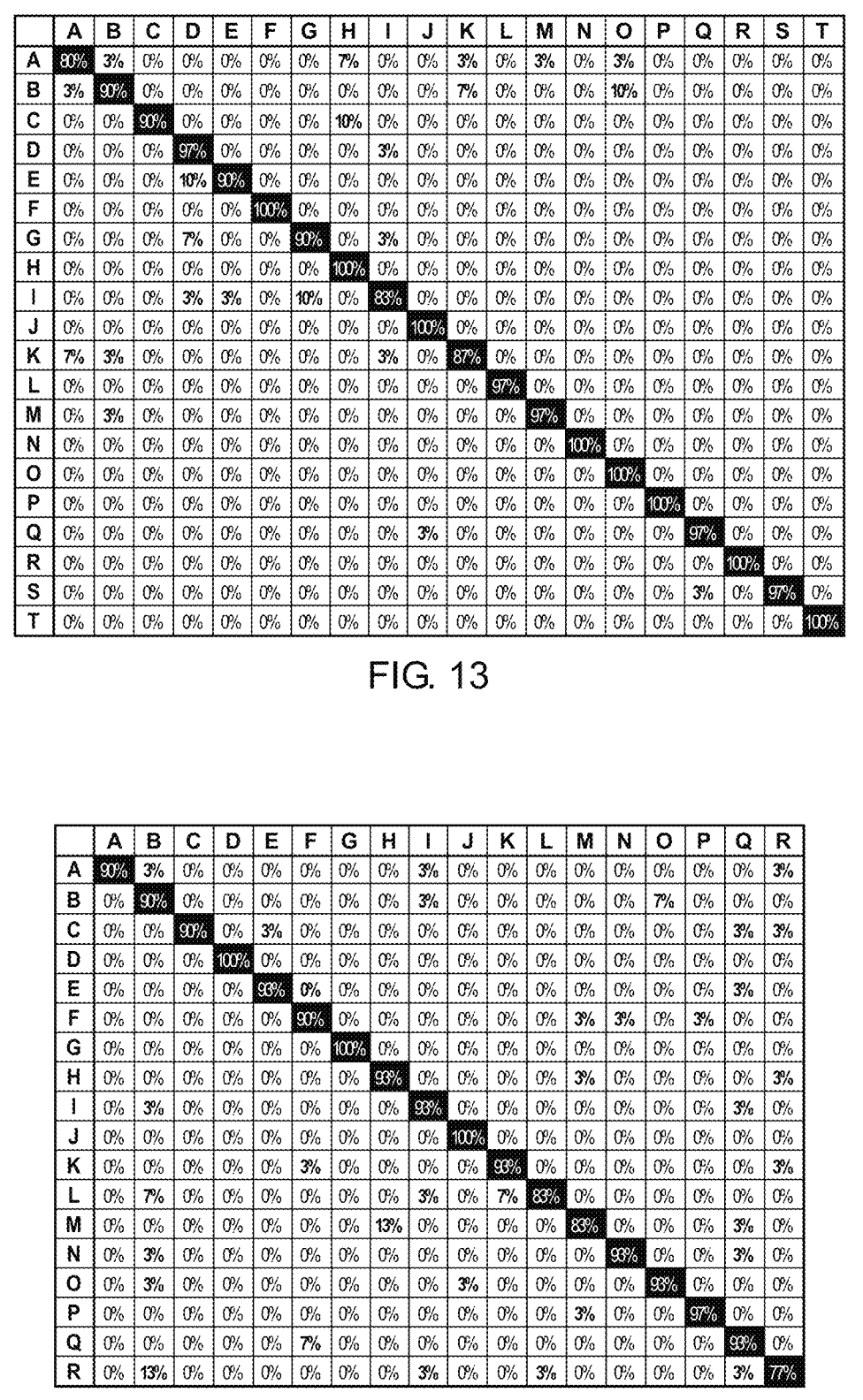

Across all trials, this embodiment of the present invention garnered an overall object recognition accuracy of 93.1% (SD=6.6%). As shown in FIG. 13, recognition accuracy for kitchen objects 58 was 94.2% (SD=6.9%), and 91.8% (SD=27.4%) for workshop objects 58 (as shown in FIG. 14). Indeed, these results highlight the present invention's ability to robustly infer objects 58 based solely on their contours creating opportunities for imbuing computing devices 30 with contextual awareness that is difficult or impossible to achieve with existing systems.

Figures 16A, 16B:
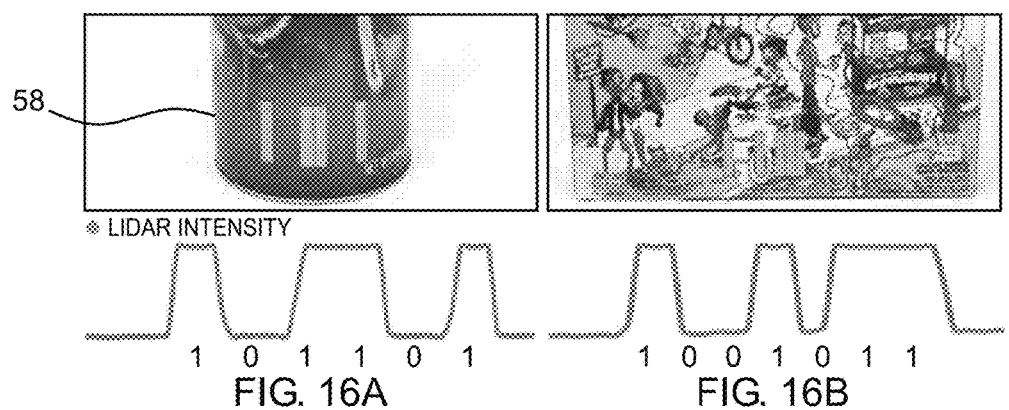
FIGS. 16A and 16B demonstrate how objects can be tagged with special retro-reflective material to increase the set of objects that can be detected by the system.

The LIDAR-based sensing approach of one embodiment of the present invention may be constrained by the types of objects 58 it can detect. The present invention is limited by collisions in object contours, and not all objects 58 reflect infrared. For example, the present invention system 10 is unable to detect transparent materials (e.g., glass), or objects 58 with highly specular surfaces (e.g., mirror finishes). One embodiment of the present invention mitigates this concern by implementing custom "tags" attached to objects 58, allowing them to reflect infrared. Another embodiment of the present invention also embedded data into these tags, similar to a low-resolution barcode. FIGS. 16A and 16B show a system 10 according to the present invention decoding an 8-bit binary data from these custom tags. Like barcodes, data can be embedded into these tags.

In sum, the present invention provides a new spin on smart device experiences where devices are imbued with rich touch and object sensing. The present invention methods, systems and devices incorporate range finding sensor(s) 36 and a full-stack signal processing pipeline and offer an expansive sensing modality immediately above the host surface area 20 on which a device 30 rests. This capability unlocks expressive input and enhanced contextual awareness, including the detection of objects 58, finger touches, hand gestures, people tracking, and body angle estimation. The evaluations reveal the immediate feasibility of this approach, and the example applications illustrate how the various embodiments of the present invention can be used to power novel and contextually aware interactive experiences.

What is claimed is:

1. A sensing system for sensing a host surface area and at least one associated input, the sensing system comprising:
   a computing device proximately located to the host surface area;
   a processing unit incorporated into the computing device;
   a range finding sensor incorporated into the computing device and, through a scanner and input channel in the range finding sensor, configured to scan and sense in a plane that is parallel and proximate to the host surface area, whereby the range finding sensor can sense the contoured shape of at least one input from a perspective within a predetermined region of the scanning and sensing plane parallel and proximate to the host surface area and around the computing device and can generate data descriptive of the at least one input; and
   a user interface; and
   wherein the processing unit is configured to perform the steps of:
   gathering the data on the input;
   clustering the data into a coherent contour;
   classifying the coherent contour;
   storing the coherent contour; and
   sending instructions to the user interface.

2. The sensing system of claim 1, wherein the input is selected from the group consisting of a hand input, one or more persons, one or more events and one or more objects.

3. The sensing system of claim 2, wherein the hand input is selected from the group consisting of touching the host surface area, a finger shape, a finger touch, a hand shape, a finger movement, hand movement and a gesture.

4. The sensing system of claim 2, wherein the one or more persons as an input comprises the detection of the one or more persons, the position of the one or more persons and/or the orientation of the one or more persons in the predetermined region.

5. The sensing system of claim 2, wherein the event as an input comprises the placement of an object within the predetermined region, the removal of an object from the predetermined region and/or the movement of an object within the predetermined region.

6. The sensing system of claim 1, wherein the user interface comprises at least one interactive application response to the input.

7. The sensing system of claim 6, wherein the at least one interactive application response is selected from the group consisting of (a) altering a behavior of an interconnected computer application, (b) triggering a reaction from the computing device to the input and (c) altering a behavior of an interconnected computer application and triggering a reaction from the computing device to the input.

8. The sensing system of claim 1, wherein the host surface area is selected from the group consisting of a horizontal surface of a built-in piece of furniture, a horizontal surface of a freestanding piece of furniture, a vertical surface of a built-in piece of furniture, a vertical surface a freestanding piece of furniture, a wall, a floor, a door and surfaces with inclined orientations.

9. The sensing system of claim 1, wherein the computing device is configured to be located on the host surface area.

10. The sensing system of claim 1, wherein the computing device is selected from the group consisting of an IoT computing device, a smart device, a computer, a speaker, a thermostat, a recipe helper, a light switch, a music player and a smart speaker.

11. The sensing system of claim 1, wherein the range finding sensor is selected from the group consisting of LIDAR, a depth camera, radar and sonar.

12. The sensing system of claim 1, wherein the range finding sensor is located in a portion of the computing device closest to the host surface area.

13. The sensing system of claim 1, wherein the processing unit comprises at least one range data buffer.

14. A method of object sensing comprising the steps of:
(a) providing a sensing system configured to scan and sense within a plane parallel and proximate to a host surface area and at least one associated input, the sensing system comprising:
   a computing device proximately located to the host surface area;
   a processing unit incorporated into the computing device;
   a range finding sensor incorporated into the computing device and configured to provide a scanner and an input channel and to scan and sense within a plane parallel and proximate to the host surface area, whereby the range finding sensor can sense at least one input from a perspective within a predetermined region of the scanning and sensing plane parallel and proximate to the host surface area and around the computing device and can generate data descriptive of the at least one input; and
   a user interface;
(b) using the range finding sensor to scan the predetermined region to detect an input within the region;
(c) using the range finding sensor to gather data on the input;
(d) using the processing unit to cluster the data into a coherent contour;
(e) using the processing unit to classify the coherent contour;
(f) using the processing unit to store the coherent contour; and
(g) using the processing unit to send instructions to the user interface.

15. The method of claim 14, wherein the input is selected from the group consisting of a hand input, one or more persons, one or more events and one or more objects.

16. The method of claim 15, wherein the hand input is selected from the group consisting of touching the surface area, a finger shape, a finger touch, a hand shape, a finger movement, hand movement and a gesture.

17. The method of claim 15, wherein the one or more persons as an input comprises the detection of the presence of the one or more persons, the position of the one or more persons and/or the orientation of the one or more persons in the predetermined region and the detection of the position of the person in the predetermined region.

18. The method of claim 15, wherein the event as an input comprises the placement of an object within the predetermined region, the removal of an object from the predetermined region and/or the movement of an object within the predetermined region.

19. The method of claim 14, wherein the user interface comprises at least one interactive application response to the input.

20. The method of claim 14, wherein the at least one interactive application response is selected from the group consisting of (a) altering a behavior of an interconnected computer application, (b) triggering a reaction from the computing device to the input and (c) altering a behavior of an interconnected computer application and triggering a reaction from the computing device to the input.

21. The method of claim 14, wherein the host surface area is selected from the group consisting of a horizontal surface of a built-in piece of furniture, a horizontal surface of a freestanding piece of furniture, a vertical surface of a built-in piece of furniture, a vertical surface a freestanding piece of furniture, a wall, a floor, a door and surfaces with other orientations.

22. The method of claim 14, wherein the computing device is configured to be located on the host surface area.

23. The method of claim 14, further comprising repeating steps (b) through (f) a predetermined number of times before sending instructions to the user interface.

24. The method of claim 14, wherein a user defines the predetermined region.

25. A device for sensing a host surface area and at least one associated input, the device comprising:
   a computing device proximately located to the host surface area;
   a processing unit incorporated into the computing device;
   a range finding sensor incorporated into the computing device with a scanner and input channel and configured to scan and sense in a plane parallel and proximate to the host surface area, whereby the range finding sensor can sense the contoured shape of at least one input from a perspective within a predetermined region of the scanning and sensing plane parallel and proximate to the host surface area and around the computing device and can generate data descriptive of the at least one input, wherein the input is selected from the group consisting of a hand input, one or more persons, one or more events and one or more objects; and
a user interface, wherein the user interface comprises at least one interactive application response to the input; and
   wherein the processing unit is configured to perform the steps of:
      gathering the data on the input
      clustering the data into a coherent contour;
      classifying the coherent contour;
      storing the coherent contour; and
      sending instructions to the user interface.

* * * * *